(12) United States Patent
Hansen et al.

(10) Patent No.: US 10,642,604 B2
(45) Date of Patent: *May 5, 2020

(54) WORKFLOW GENERATION AND EDITING

(71) Applicant: Microsoft Technology Licensing, LLC, Redmond, WA (US)

(72) Inventors: Marc Hansen, Vedbeak (DK); Stuart Glasson, Copenhagen (DK); Chethan Thopaiah, Copenhagen (DK); Thomas Hejlsberg, Horsholm (DK); Gert Willem Robyns, Hellerup (DK); Jacob Winther Jespersen, Copenhagen (DK); Mostafa Balat, Copenhagen (DK); Bogdan Sturzoiu, Copenhagen (DK); Cristian-Alexandru Chereches, Copenhagen (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 171 days.

This patent is subject to a terminal disclaimer.

(21) Appl. No.: 15/897,509

(22) Filed: Feb. 15, 2018

(65) Prior Publication Data
US 2018/0275985 A1  Sep. 27, 2018

Related U.S. Application Data

(63) Continuation of application No. 14/747,776, filed on Jun. 23, 2015, now Pat. No. 9,934,026.

(51) Int. Cl.
*G06F 8/656* (2018.01)
*G06Q 10/06* (2012.01)

(52) U.S. Cl.
CPC ............ *G06F 8/656* (2018.02); *G06Q 10/06* (2013.01)

(58) Field of Classification Search
CPC .......... G06F 8/20; G06F 8/34; G06Q 10/0633
See application file for complete search history.

(56) References Cited

U.S. PATENT DOCUMENTS

| | | |
|---|---|---|
| 5,999,911 A | 12/1999 | Berg et al. |
| 8,090,611 B2 | 1/2012 | Hodges et al. |
| 8,170,901 B2 | 5/2012 | Shukla et al. |
| 8,627,324 B2 | 1/2014 | Irani et al. |
| 8,856,291 B2 | 10/2014 | Bartlett et al. |
| 9,934,026 B2 * | 4/2018 | Hansen .................. G06F 8/656 |
| 2006/0074733 A1 | 4/2006 | Shukla et al. |
| 2007/0135936 A1 | 6/2007 | Dumas et al. |
| 2007/0276692 A1 | 11/2007 | Mei et al. |
| 2009/0024986 A1 | 1/2009 | Meijer et al. |
| 2010/0293538 A1 | 11/2010 | Wolf et al. |

(Continued)

OTHER PUBLICATIONS

"Create Real-Time Workflows", Retrieved From: https://msdn.microsoft.com/en-us/library/dn481598.aspx, Retrieved on: Jun. 25, 2015, 3 Pages.

(Continued)

*Primary Examiner* — Brian W Wathen
(74) *Attorney, Agent, or Firm* — Christopher J. Volkmann; Kelly, Holt & Christenson, PLLC

(57) ABSTRACT

Workflow definitions are broken into a set of components. Each workflow component has an instance-specific workflow definition that it operates from. Different steps can be injected into different workflow instance-specific definitions, based upon a given state of each individual workflow instance.

18 Claims, 19 Drawing Sheets

(56) References Cited

U.S. PATENT DOCUMENTS

| | | |
|---|---|---|
| 2011/0145326 A1 | 6/2011 | Lee et al. |
| 2012/0079409 A1 | 3/2012 | Luo et al. |
| 2012/0197975 A1 | 8/2012 | Samson et al. |
| 2013/0041707 A1 | 2/2013 | Bose et al. |
| 2013/0042226 A1 | 2/2013 | Glick et al. |
| 2014/0058788 A1 | 2/2014 | Breiter et al. |
| 2014/0067457 A1 | 3/2014 | Nagendra et al. |
| 2014/0278714 A1 | 9/2014 | Gotoh et al. |
| 2014/0372324 A1 | 12/2014 | Mercuri |
| 2015/0120327 A1 | 4/2015 | Compton et al. |
| 2015/0193706 A1 | 7/2015 | Iwasaki |
| 2016/0378575 A1 | 12/2016 | Hansen et al. |

OTHER PUBLICATIONS

"Cutting-Edge Workflow Automation", Retrieved From: https://web.archive.org/web/20150915192201/https://www.comindware.com/tracker/workflow-automation/, Retrieved on: Jun. 25, 2015, 3 Pages.

"Documentation for CQ 5.2 WCM", Retrieved From: https://web.archive.org/web/20150220034804/https://docs.adobe.com/docs/v5_2/html-resources/cq5_howto_workflow/cq5_howto_workflow.html, Retrieved on: Dec. 21, 2014, 12 Pages.

"Using Process Builder (Beta)", Retrieved From: https://web.archive.org/web/20150601145234/https://help.salesforce.com/servlet/servlet.FileDownload?file=015300000035wMDAAY, Sep. 17, 2014, 38 Pages.

"Second Written Opinion Issued in PCT Application No. PCT/US2016/038282", dated Jan. 25, 2017, 6 Pages.

"Final Office Action Issued in U.S. Appl. No. 14/747,776", dated May 8, 2017, 19 Pages.

"Non Final Office Action Issued in U.S. Appl. No. 14/747,776", dated Oct. 5, 2016, 20 Pages.

"Notice of Allowance Issued in U.S. Appl. No. 14/747,776", dated Aug. 25, 2017, 5 Pages.

"Notice of Allowance Issued in U.S. Appl. No. 14/747,776", dated Nov. 17, 2017, 5 Pages.

Mohan, et al., "A State Machine Approach for a Process Driven Development of Web-Applications", In Proceedings of 14th International Conference on Advanced Information Systems Engineering, May 27, 2002, 15 Pages.

"International Preliminary Report on Patentability Issued in PCT Application No. PCT/US2016/038282", dated Apr. 18, 2017, 07 Pages.

"International Search Report and Written Opinion Issued in PCT Application No. PCT/US2016/038282", dated Aug. 5, 2016, 11 Pages.

"Using Workflowidentity and Versioning", Retrieved From: https://web.archive.org/web/20140212035304/http://msdn.microsoft.com:80/en-us/library/hh314054(v=vs.110).aspx, Feb. 12, 2014, 4 Pages.

\* cited by examiner

| Workflow Step ID | Entry Point | Status | Type | Function Name | Created Date-Time | Created By User ID | Last Modified By Date-Time | Created By User ID |
|---|---|---|---|---|---|---|---|---|
| 162 | ☑ | Completed | Event | RUNWORKFLOWONS... | 21-05-2015 14:51 | EUROPENDOE | 21-05-2015 14:51 | EUROPENDOE |
| 163 | ■ | Completed | Response | SETSTATUSOPENDI... | 21-05-2015 14:51 | EUROPENDOE | 21-05-2015 14:51 | EUROPENDOE |
| 164 | ■ | Completed | Response | CREATEAPPROVAL... | 21-05-2015 14:51 | EUROPENDOE | 21-05-2015 14:51 | EUROPENDOE |
| 165 | ■ | Completed | Response | SENDAPPROVALREQ... | 21-05-2015 14:51 | EUROPENDOE | 21-05-2015 14:51 | EUROPENDOE |
| 166 | ■ | Completed | Response | INFORMUSERONSTA... | 21-05-2015 14:51 | EUROPENDOE | 21-05-2015 14:51 | EUROPENDOE |
| 167 | ■ | Active | Event | RUNWORKFLOWON... | 21-05-2015 14:51 | EUROPENDOE | | EUROPENDOE |
| 168 | ■ | Inactive | Response | RELEASEDOCUMENT | 21-05-2015 14:51 | EUROPENDOE | | |
| 169 | ■ | Active | Event | RUNWORKFLOWON... | 21-05-2015 14:51 | EUROPENDOE | 21-05-2015 14:51 | EUROPENDOE |
| 170 | ■ | Inactive | Response | SENDAPPROVALREQ... | 21-05-2015 14:51 | EUROPENDOE | 21-05-2015 14:51 | EUROPENDOE |
| 171 | ■ | Active | Event | RUNWORKFLOWON... | 21-05-2015 14:51 | EUROPENDOE | | |
| 172 | ■ | Inactive | Response | REJECTALLAPPROVA... | 21-05-2015 14:51 | EUROPENDOE | | |
| 173 | ■ | Inactive | Response | OPENDOCUMENT | 21-05-2015 14:51 | EUROPENDOE | | |
| 174 | ■ | Active | Event | RUNWORKFLOWON... | 21-05-2015 14:51 | EUROPENDOE | | |
| 175 | ■ | Inactive | Response | CANCELAPPROVAL... | 21-05-2015 14:51 | EUROPENDOE | 21-05-2015 14:51 | EUROPENDOE |
| 176 | ■ | Inactive | Response | OPENDOCUMENT | 21-05-2015 14:51 | EUROPENDOE | | |
| 177 | ■ | Active | Event | RUNWORKFLOWON... | 21-05-2015 14:51 | EUROPENDOE | 21-05-2015 14:51 | EUROPENDOE |
| 178 | ■ | Inactive | Response | SENDAPPROVALREQ... | 21-05-2015 14:51 | EUROPENDOE | 21-05-2015 14:51 | EUROPENDOE |

FIG. 8D

WORKFLOW GENERATION AND EDITING

CROSS-REFERENCE TO RELATED APPLICATION

The present application is a continuation of and claims priority of U.S. patent application Ser. No. 14/747,776, filed Jun. 23, 2015, the content of which is hereby incorporated by reference in its entirety

BACKGROUND

Computing systems are currently in wide use. Some computing systems are deployed at end user organizations and they assist the end user organizations in performing the operations undertaken by the organization.

Some such computing systems implement processes that are defined and implemented in various ways. They can, for instance, be defined in metadata and the process can be realized by an instance of a workflow that runs the process. Therefore, the computing system can monitor for triggering events, that trigger the instantiation and running of a workflow, which performs a process. This type of workflow definition can be difficult to manage For instance, at any given time during the runtime processing of the computing system, a plurality of different processes can be active. Multiple workflow instances, for example, may be executing multiple different processes (or multiple instances of the same process) during runtime. These workflows may all be in different states. Therefore, if a user wishes to modify the process definition, it can be difficult to apply the modification. The workflows may be defined by a global definition. Attempting to apply a modification to the global definition of a workflow may be disruptive, because the multiple instances of the running workflows may be at different states so the modification may or may not be applied. Therefore, attempting to modify them uniformly cannot be done, simply by changing the global definition.

The discussion above is merely provided for general background information and is not intended to be used as an aid in determining the scope of the claimed subject matter.

SUMMARY

Workflow definitions are broken into a set of components. Each workflow component has an instance-specific workflow definition that it operates from. Different steps can be injected into different instance-specific definitions, based upon a given state of each individual workflow instance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 8A-1 to 8D show examples of user interface displays.

DETAILED DESCRIPTION

Figure 1:
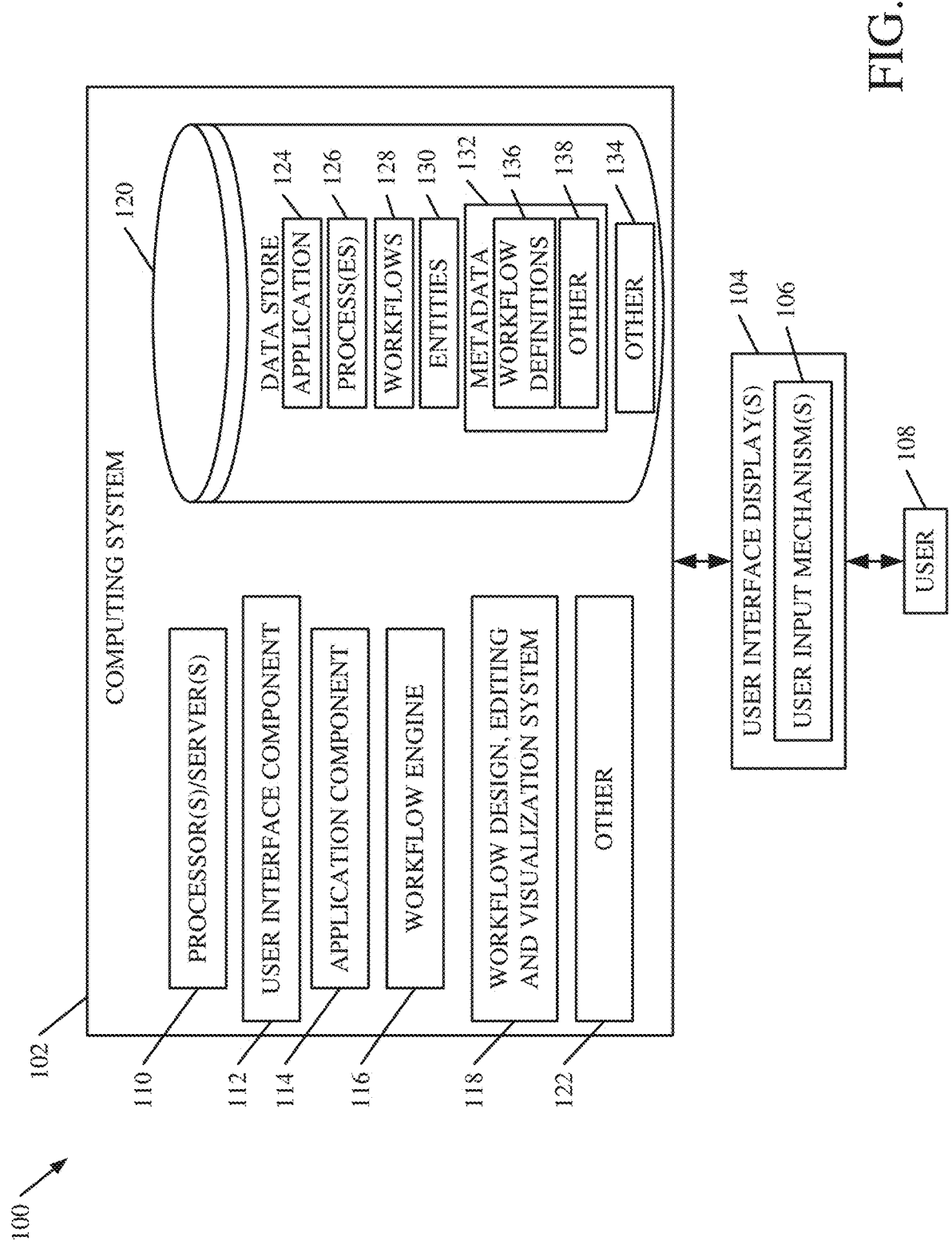
FIG. 1 is a block diagram of one example of a computing system architecture.

FIG. 1 is a block diagram of one example of a computing system architecture 100. Computing system architecture 100 illustratively includes computing system 102 that generates a set of user interface displays 104, with user input mechanisms 106, for interaction by user 108. User 108 illustratively interacts with user input mechanisms 106 in order to control and manipulate computing system 102. In one example, user 108 can be an end user that is using computing system 102. In another example, user 108 can be an administrative user, a developer, or another user that may perform administrative operations on computing system 102, perform development operations for computing system 102, perform debug operations, or other operations.

In the example shown in FIG. 1, computing system 102 illustratively includes processors or servers 110, user interface component 112, application component 114, workflow engine 116, workflow design, editing and visualization system 118, data store 120, and it can include other items 122. In the example shown in FIG. 1, data store 120 illustratively includes one or more applications 124, a set of processes 126, workflows 128, entities 130, metadata 132, and it can include other items 134. Metadata 132 can define the applications 124, processes 126, workflows 128, entities 130, etc., and be attached to those items. However, it can also be separate metadata that is separate from those items. In the example illustrated in FIG. 1, metadata 132 illustratively includes workflow definition metadata 136 that defines workflows 128. It can, as briefly mentioned above, include a wide variety of other metadata 138, as well.

Before describing architecture 100 in more detail, a brief overview will first be provided. In one example, workflow design, editing and visualization system 118 illustratively generates user interface displays with user input mechanisms that can be actuated by user 108 in order to design, edit and/or visualize various workflows 128. As is described in greater detail below, user 108 can design workflows to be broken up into a set of individual components. Each component may have a set of steps that are executed, under certain conditions. The designed workflows can be stored as workflows 128 in data store 120 where they can be run by application component 114, and workflow engine 116, during runtime.

Application component 114 illustratively runs applications 124 in computing system 102. The applications can run processes 126 and workflows 128, and it can operate on entities 130 or other data. In doing so, application component 114 illustratively uses workflow engine 116 to monitor events and other things within computing system 102 to determine whether any of the processes or workflows has been triggered. If so, workflow engine 116 assigns a workflow agent to execute the workflow. The workflow agent illustratively downloads an instance-specific copy of the workflow definitions 136 for the corresponding workflow, and executes the workflow from that definition.

When a user 108 (such as an administrative user or developer) wishes to make a change to one of the workflow definitions 136, the user 108 illustratively uses system 118 to visualize the state that each of the running instances of the workflows are in, and generate a step injection package that injects steps in each of the instance-specific copies of the workflow definition, to apply the modification to the corresponding in-flight workflow. All of this is described in greater detail below.

Figure 2:
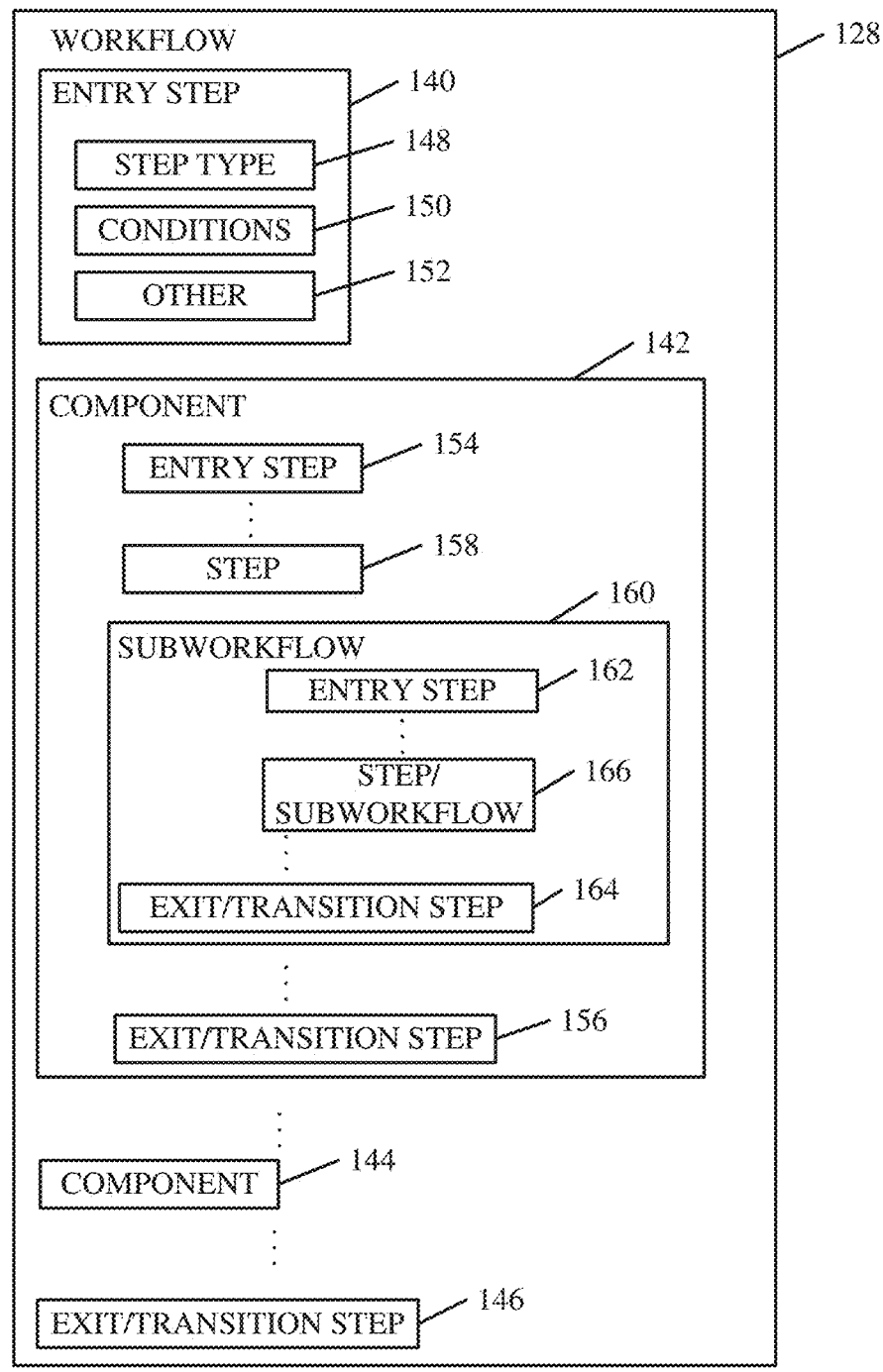
FIG. 2 is a block diagram of one example of a workflow.

FIG. 2 shows a block diagram of one example of a workflow 128. It will be appreciated that workflow 128 can be made up of a wide variety of different items, and those shown in FIG. 2 are shown for the sake of example only. In general, workflow 128 can be arranged as a connected hierarchy of steps or components. The hierarchy can illustratively be visualized and edited. In the example shown in FIG. 2, workflow 128 illustratively includes an entry step 140, a set of components 142-144, and an exit or transition step 146. Each step can illustratively have a step type 148, a set of one or more conditions 150 that trigger execution of the step, and it can include other items 152.

The entry step is illustratively a starting point in a workflow, component or sub-workflow. It may illustratively have entry conditions 150 that define when and how the workflow, component or sub-workflow can be automatically instantiated. When the respective activities within computing system 102 meet the conditions of the entry step, then this can trigger the instantiation of a corresponding workflow instance, on-the-fly.

The type of each workflow step may be an "Event" or "Response" or other types. An "Event" type triggers the execution of the "Response" type. The events and responses, in one example, can be freely mixed by the user while designing a workflow 128 in order to design the implementation of a process.

In one example, workflow 128 is broken up into the individual components 142-144. The individual components can also each have an entry step 154 and an exit or transition step 156. The components can have a variety of other steps 158 that may be executed between the entry and exit steps 154 and 156, respectively. The component can also include one or more sub-workflows 160. Each sub-workflow can have its own entry step 162 and exit or transition step 164 and have a plurality of steps or sub-workflows 166 disposed there between.

It can thus be seen that the workflows 128 include workflow steps that are placed in order of expected execution. The step type of each workflow step can be specified, and the conditions to control the flow or options that control the flow or provide input that is used in orchestrating the behavior of the workflow, can also be provided.

Figure 3:
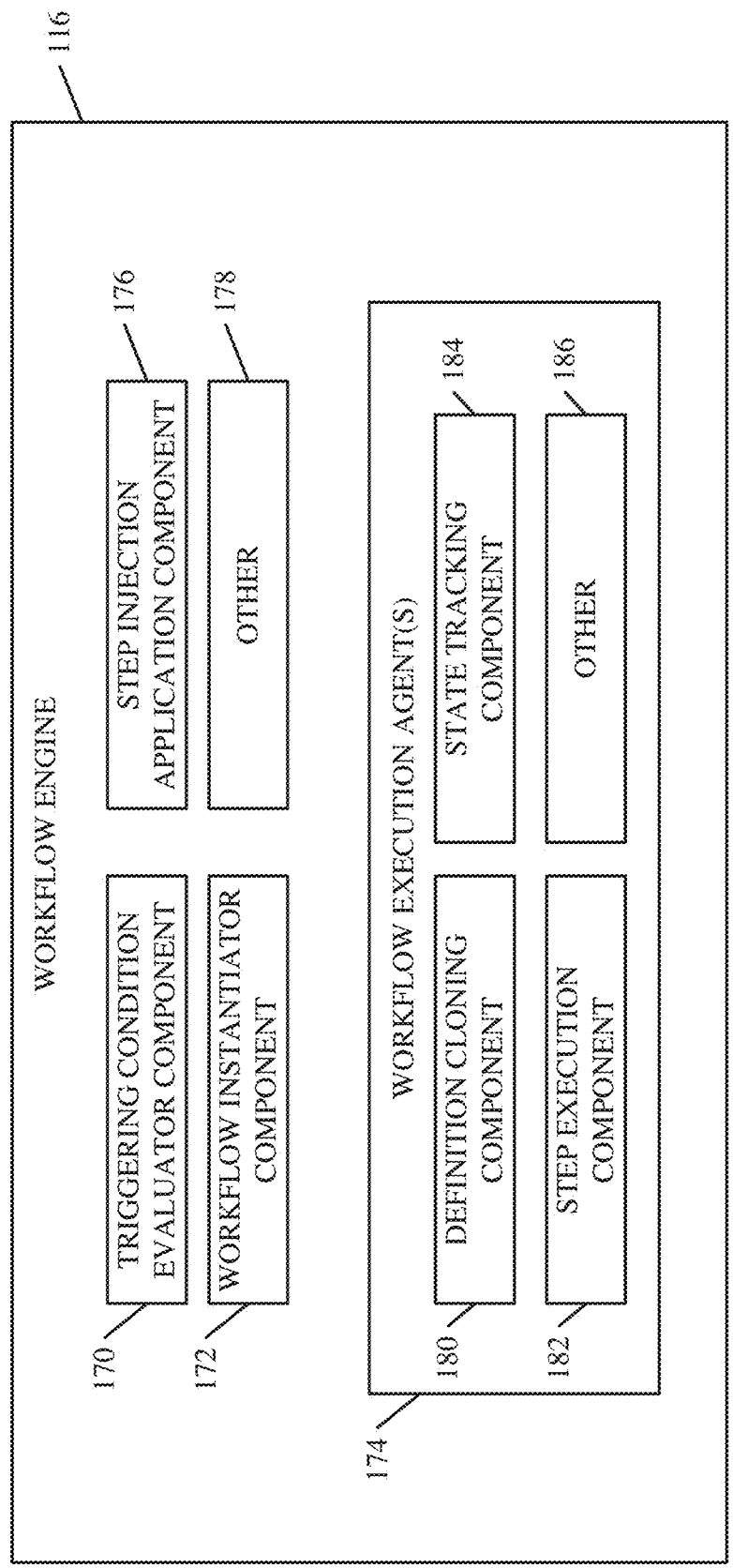
FIG. 3 is a more detailed block diagram of one example of a workflow engine.

FIG. 3 is a block diagram of one example of workflow engine 116, in more detail. In the example shown in FIG. 3, workflow engine 116 illustratively includes triggering condition evaluator component 170, workflow instantiator component 172, one or more workflow execution agents 174, step injection application component 176, and it can include other items 178. Workflow execution agents 174 each illustratively include a definition cloning component 180, step execution component 182, state tracking component 184, and they can include other items 186.

Triggering condition evaluator component 170 in workflow engine 116 illustratively monitors the events or activities within computing system 102 to determine whether any triggering conditions, for any defined workflows, have been met. When they are met, workflow instantiator component 172 illustratively accesses the metadata for the workflow and instantiates an instance of the triggered workflow. It also illustratively assigns a workflow execution agent 174 to execute the steps in the workflow. Definition cloning component 180 in agent 174 makes an instance-specific copy of the workflow definition 136 for the triggered workflow and step execution component 182 executes the steps, from the instance-specific copy of the workflow definition 136. State tracking component 184 tracks the state of the instance of the workflow, and can report that back, through workflow design, editing and visualization system 118, as is described below.

Step injection application component 176 receives any step injection packages that are to be applied, in order to modify the operation of the workflow. For instance, as is described in greater detail below with respect to FIG. 4, when a user generates an injection package in order to modify a workflow, some instances of that workflow definition may be running In that case, the step injection application component 176 in the workflow engine 116 receives the step injection package and provides it to the corresponding workflow execution agent 174 where it can be applied to the instance-specific workflow definition that was generated by definition cloning component 180. Once applied, the step execution component 182 will follow the steps in the step injection package to effectively implement the modifications to the workflow definition that are represented by the step injection package.

Figure 4:
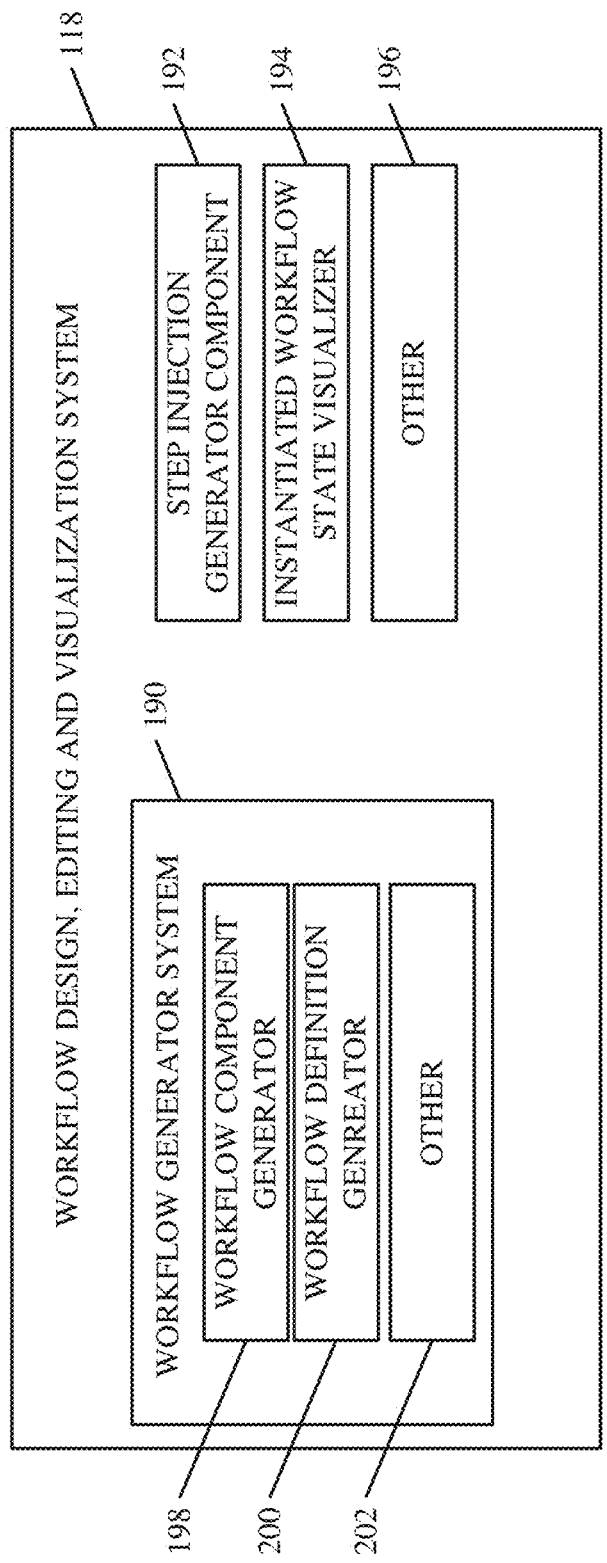
FIG. 4 is a more detailed block diagram of one example of a workflow design, editing and visualization system.

FIG. 4 is a block diagram of one example of workflow design, editing and visualization system 118, in more detail. System 118 illustratively includes workflow generator system 190, step injection component 192, instantiated workflow state visualizer 194, and it can include other items 196. Workflow generator system 190 can include workflow component generator 198 that generates user interface displays with user input mechanisms that allow a user to divide workflows into components, or to generate components of a workflow. System 190 also illustratively includes workflow definition generator 200 that allows the user to further define the various steps, components, sub-workflows, etc., of a workflow. System 190 can include other items 202 as well.

Instantiated workflow state visualizer 194 illustratively allows the user to visualize the state of any instantiated workflows that are currently in-flight (or currently being executed during runtime operation). It also allows the user to visualize the state of any workflows that are being run for purposes of development or debugging.

Where the user wishes to modify a workflow definition for a workflow that has some in-flight instances running, step injection component 192 illustratively generates a user interface, with user input mechanisms, that allow the user to generate an injection package for each in-flight workflow.

The injection package can include a set of steps that will cause the workflow to be executed in such a way that the modifications will be applied to the workflow. This is described in greater detail below.

Figure 5:
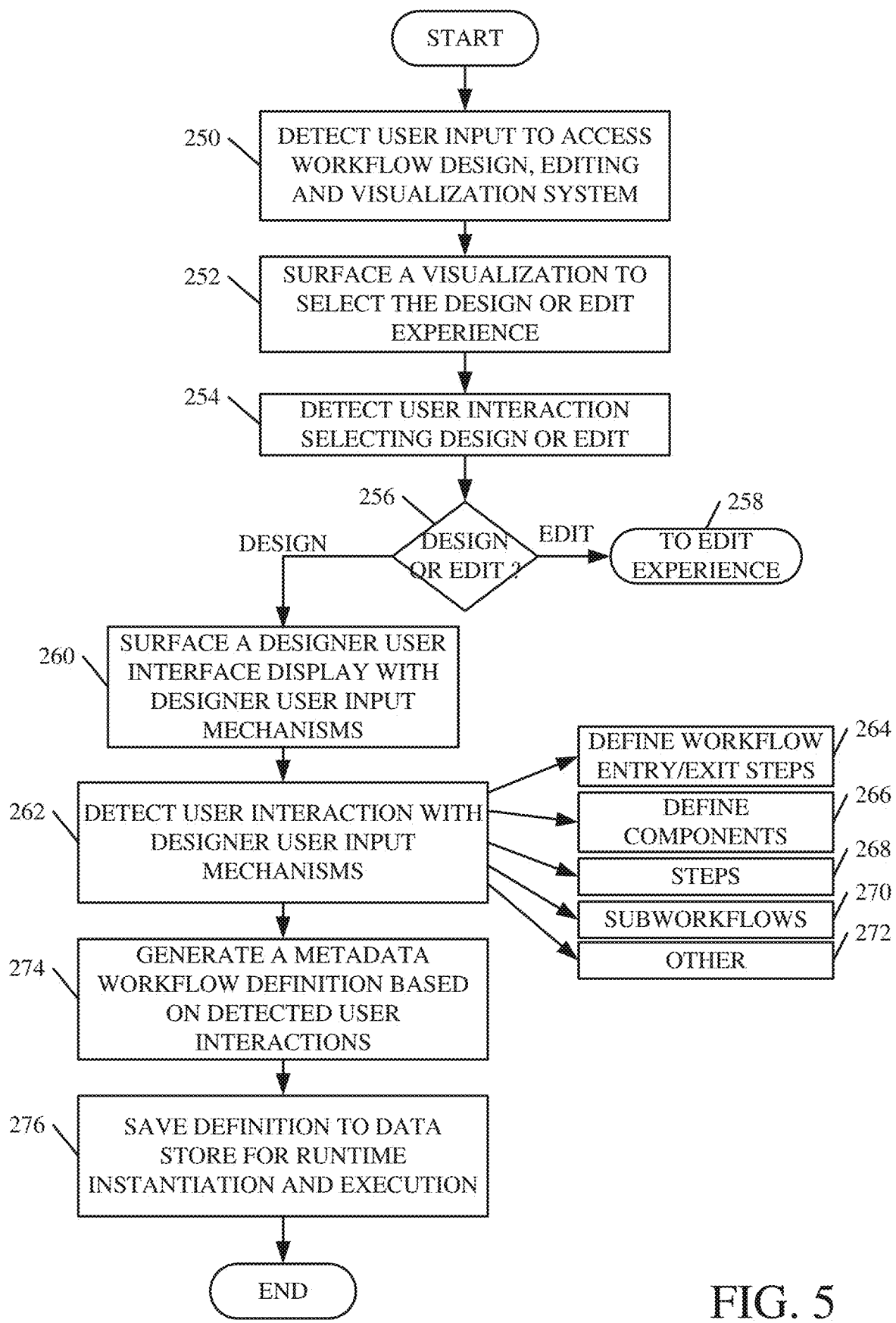
FIG. 5 is a flow diagram illustrating one example of the operation of the architecture shown in FIG. 1 in conducting a workflow design experience.

FIG. 5 is a flow diagram illustrating one example of the operation of workflow design, editing and visualization system 118 in conducting a design experience that allows the user to design or generate a workflow 128. It is first assumed that user 108 is accessing computing system 102. User interface component 112 then detects a user input indicating that the user wishes to access the workflow design, editing and visualization system 118. This is indicated by block 250 in FIG. 5. As one example, the user may actuate a user input mechanism indicating that the user wishes to design a new workflow. The user may provide such an input in other ways as well.

System 118 then surfaces a visualization with a user input mechanism that allows the user to indicate whether the user wishes to design a new workflow or edit an existing workflow. This is indicated by block 252. System 118 then detects user interaction selecting either the design experience or the edit experience. This is indicated by block 254. If the user has selected the edit experience (in which case the user wishes to edit an existing workflow) then the user is navigated to an edit experience that is described in greater detail below with respect to FIG. 7. This is indicated by blocks 256 and 258 in FIG. 5.

However, if, at block 256, it is determined that the user has selected the design experience, then workflow generator system 190 illustratively controls user interface component 112 to surface a designer user interface display, with designer user input mechanisms that can be actuated in order to perform design operations to design or generate a new workflow. This is indicated by block 260 in FIG. 5. Workflow generator system 190 then detects user interaction with the designer user input mechanisms, as indicated by block 262. This can take a wide variety of different forms. For instance, the user inputs can define workflow entry and exit steps as indicated by block 264. They can define components as indicated by block 266. They can define individual steps 268 or sub-workflows 270. They can take a wide variety of other forms 272 as well.

Workflow definition generator 200 then generates a metadata workflow definition for the workflow, based upon the detected user interactions. This is indicated by block 274 in FIG. 5. System 190 then saves the metadata workflow definition to data store 120 (shown in FIG. 1) for runtime instantiation and execution. This is indicated by block 276.

Figure 6:
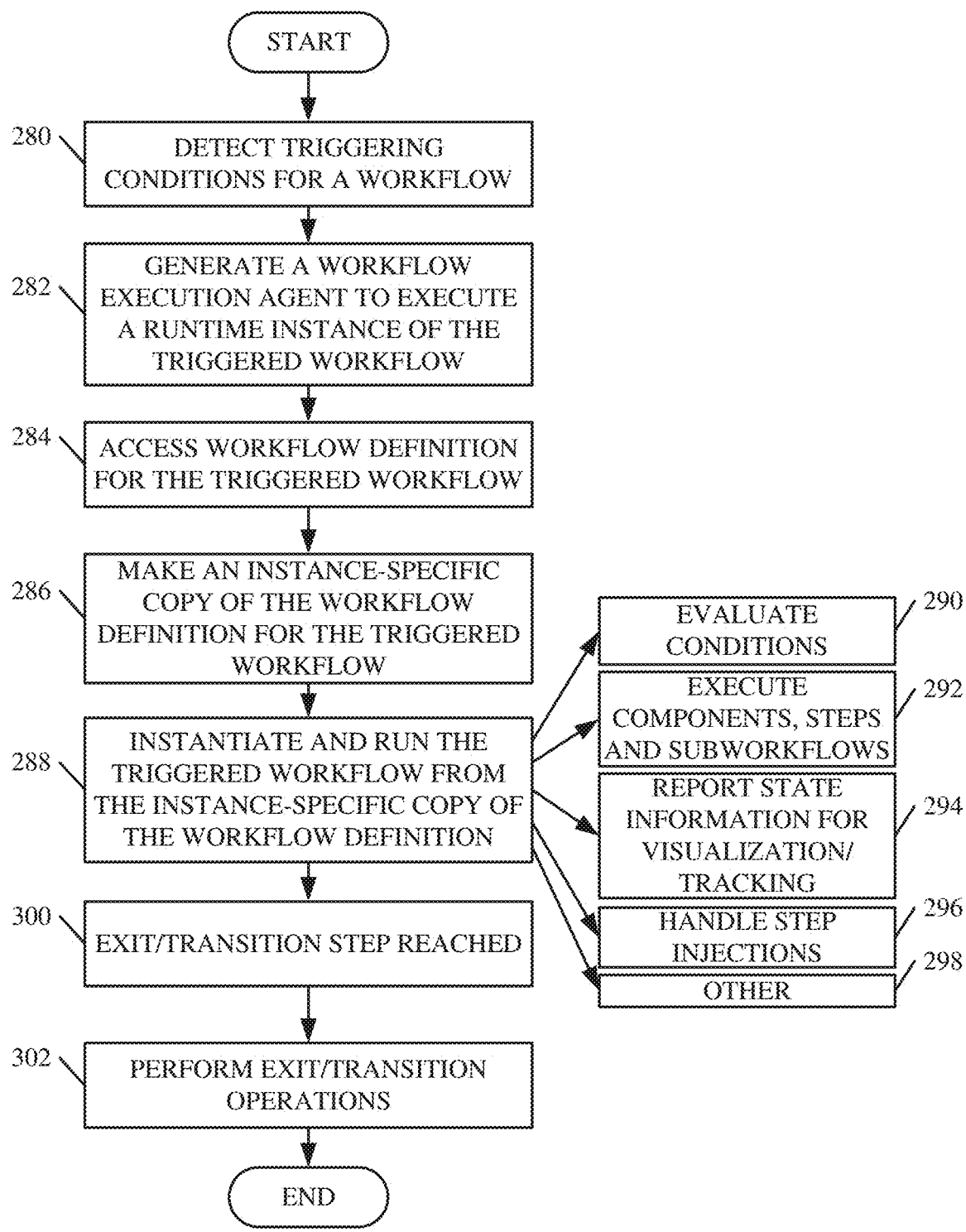
FIG. 6 is a flow diagram illustrating one example of the operation of the architecture shown in FIG. 1, during runtime.

FIG. 6 is a flow diagram illustrating one example of the operation of workflow engine 116, in instantiating and executing a workflow. In the example illustrated in FIG. 6, triggering condition evaluator component 170 detects triggering conditions to trigger a given workflow. This is indicated by block 280 in FIG. 6. Workflow instantiator component then generates a workflow execution agent 174 to execute a runtime instance of the triggered workflow. This is indicated by block 282 in FIG. 6.

Definition cloning component 180, in agent 174, then accesses the workflow definition for the triggered workflow, from data store 120. This is indicated by block 284. Component 180 illustratively makes an instance-specific copy of the workflow definition, for the triggered workflow. This is indicated by block 286. Step execution component 182 then controls execution of the steps, components and sub-workflows, in the triggered workflow, from the instance-specific copy of the workflow definition. Instantiating and running the triggered workflow from the instance-specific copy of the definition is indicated by block 288.

In doing so, step execution component 182 illustratively evaluates conditions to determine whether the conditions for executing a step have been met. It can do the same to determine whether the conditions for executing a component, a sub-workflow, etc., have been met. Evaluating the conditions in this way is indicated by block 290 in FIG. 6. Component 182 then executes the components, steps and sub-workflows, in the expected order, as defined by the hierarchy in the workflow definition metadata. This is indicated by block 292.

State tracking component 184 can also track the state of the running workflow and report state information indicative of that state. The state information can be output for visualization, state tracking, or other reasons. This is indicated by block 294.

If a user wishes to modify a running workflow instance, then step injection application component 176 handles application of the step injection package to the running instance. This is indicated by block 296, and it is described in greater detail below with respect to FIG. 7. The workflow can be instantiated and run in other ways as well, and this is indicated by block 298.

At some point, the workflow will reach its exit or transition step, at which point the workflow execution is complete. This is indicated by block 300. Step execution component 182 (or other items in workflow engine 116) can then perform any exit or transition operations which cause engine 116 to exit the workflow or transition to another workflow or sub-workflow. This is indicated by block 302 in FIG. 6.

Figure 7A:
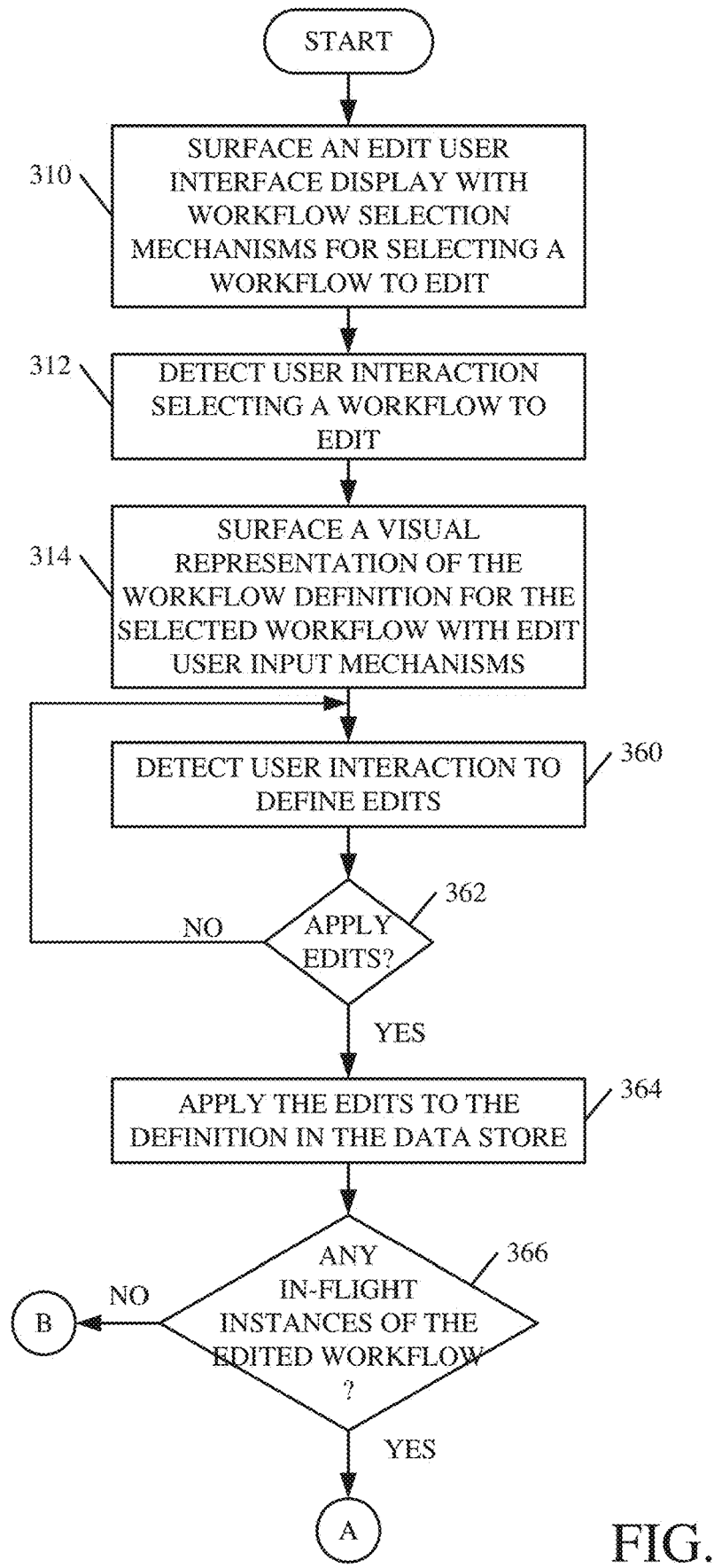
FIGS. 7A and 7B (collectively referred to herein as FIG. 7) show a flow diagram illustrating one example of the operation of the architecture shown in FIG. 1 in editing a workflow definition.
Figure 7B:
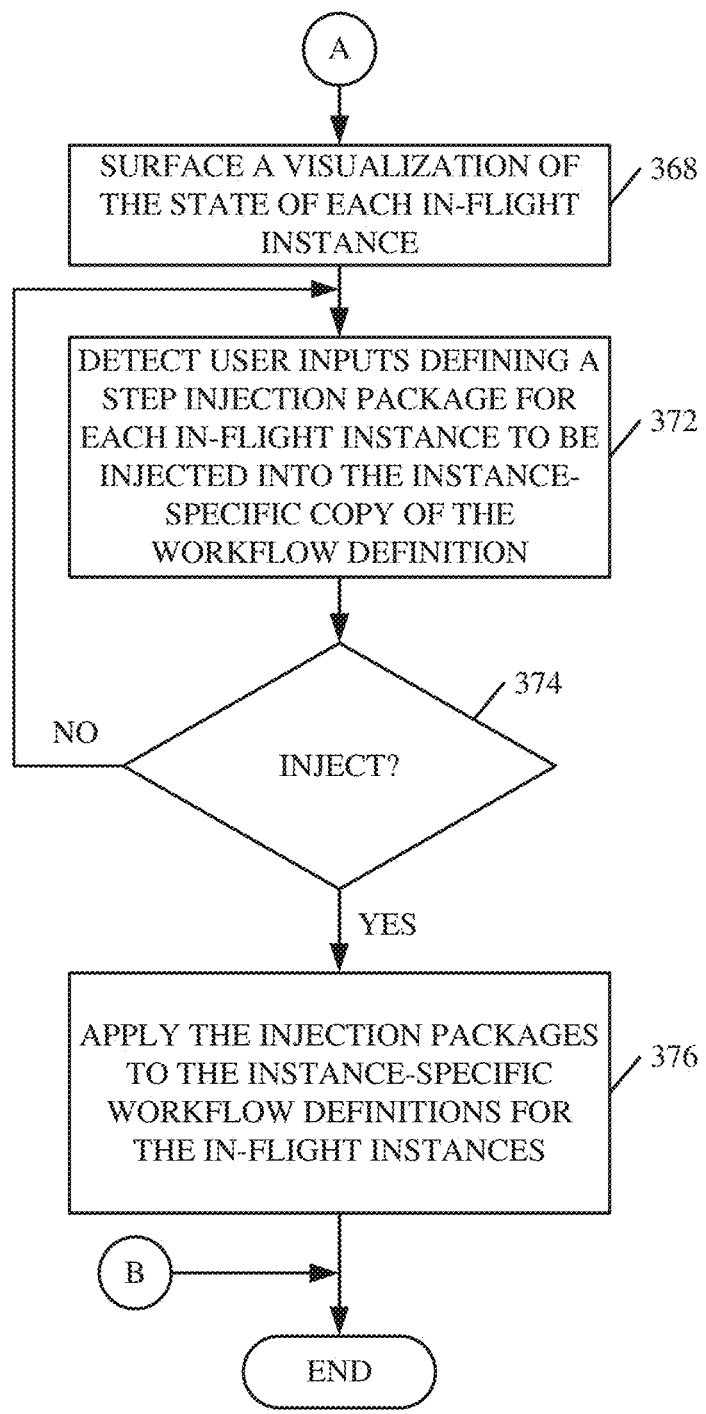

FIGS. 7A and 7B (collectively referred to herein as FIG. 7) show one example of a flow diagram illustrating the operation of workflow engine 116 and system 118 in editing or otherwise modifying a workflow definition, even while instances of that workflow are running It is first assumed that the user has provided an input to access the workflow design, editing and visualization system 118 and that the user has selected the edit experience as indicated by block 258 in FIG. 5. In response, system 118 controls user interface component 112 (in FIG. 1) to surface an edit user interface display with one or more workflow selection mechanisms that the user can actuate to select a workflow to edit. This is indicated by block 310 in FIG. 7. System 118 then detects user interaction with the one or more selection mechanisms to identify a selected workflow for editing. This is indicated by block 312. System 118 then surfaces a visual representation of the workflow definition, for the selected workflow, with edit user input mechanisms that can be actuated to edit the workflow definition. This is indicated by block 314.

Figures 1, 8A:
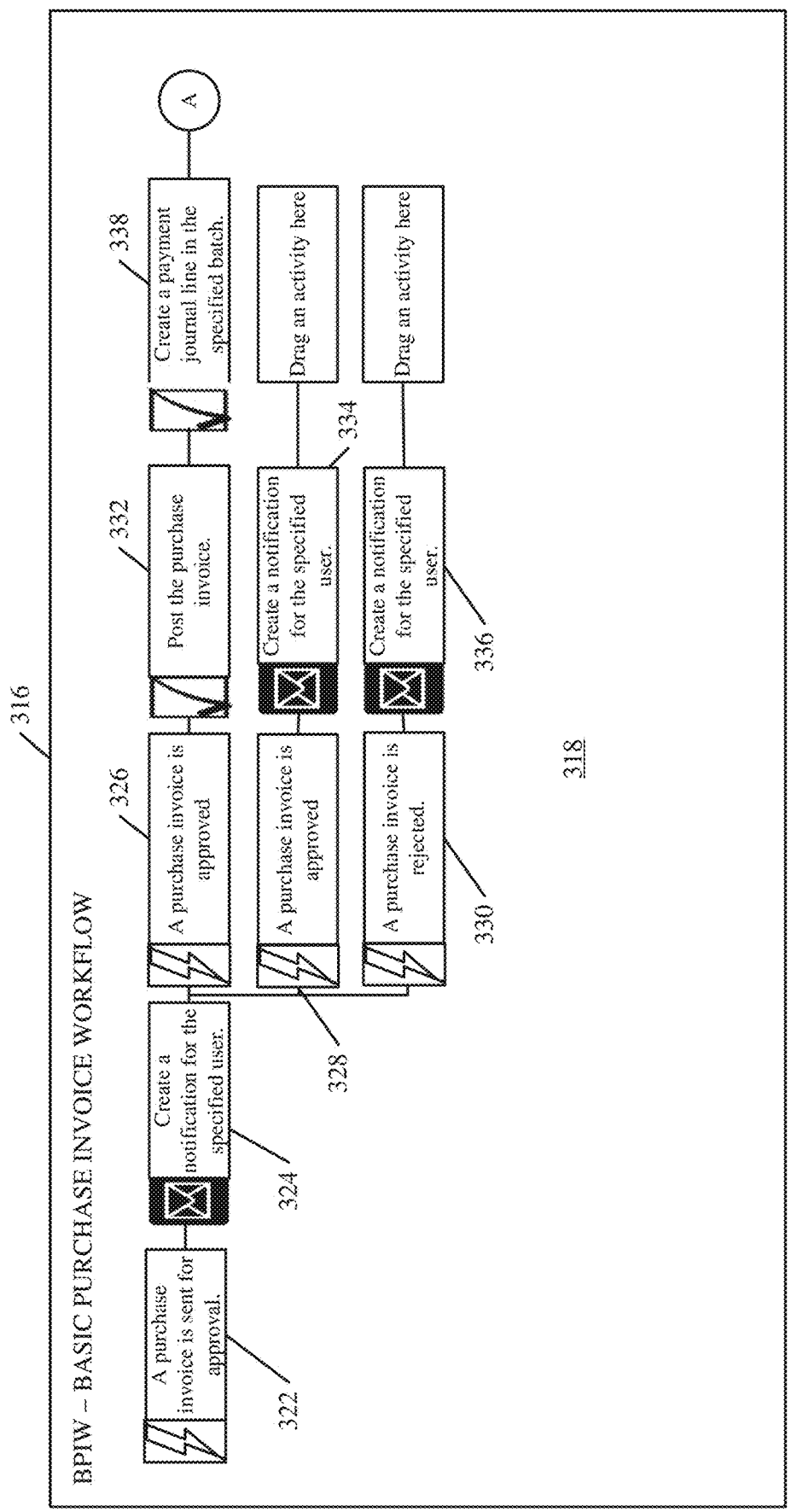
Figures 2, 8A:
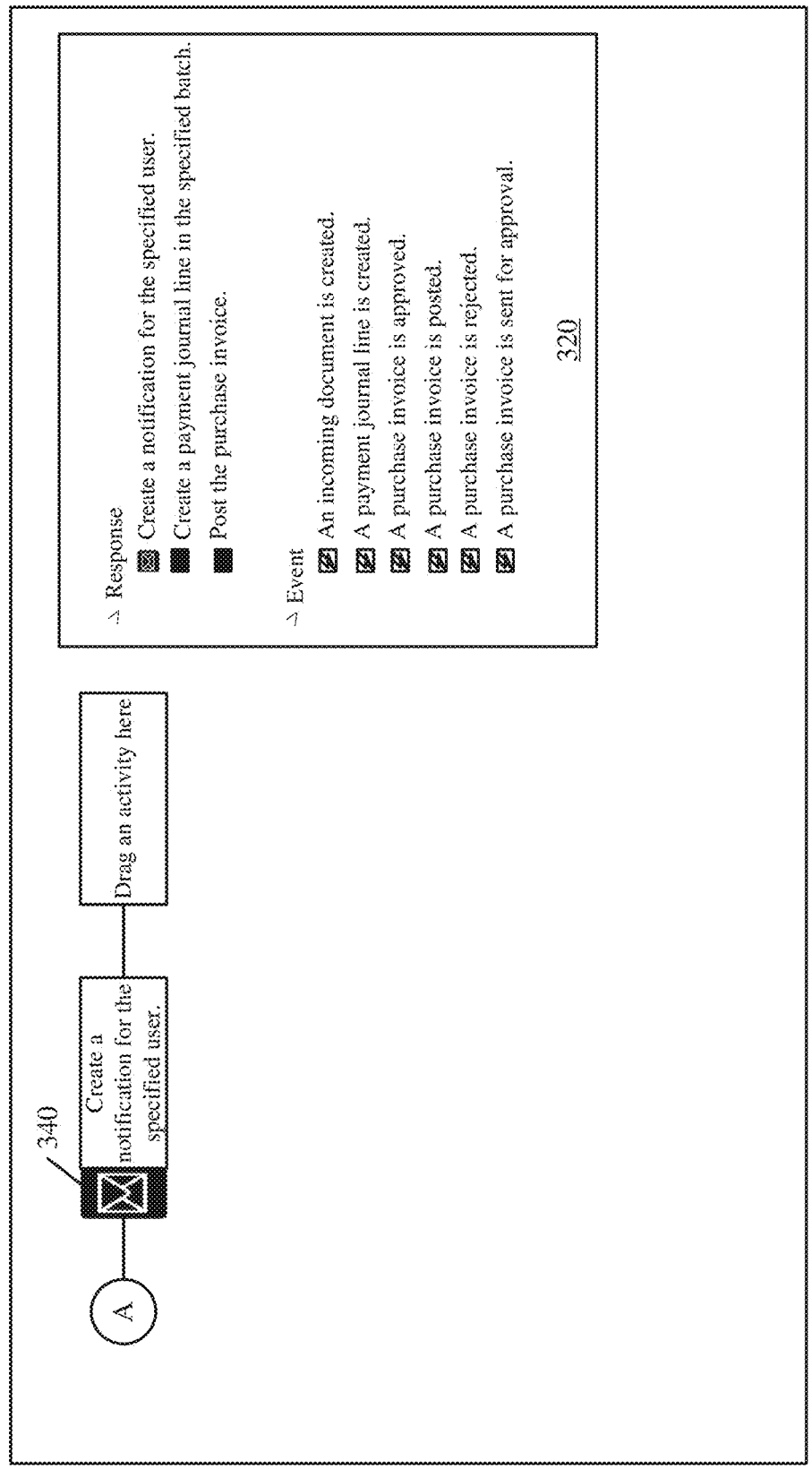

FIGS. 8A-1 to 8A-2 (collectively referred to as FIG. 8A) shows one example of a user interface display that displays a visual workflow designer display. It can be seen in FIG. 8A that display 316 illustratively includes a workflow display pane 318 and a workflow element selection pane 320. Elements (such as responses and events) can be selected from selection pane 320 and dragged to display pane 318. They can be placed in the proper order in workflow display pane 318. Thus, each of the visual display elements 322-340 represents a step in the workflow displayed in pane 318. The user can illustratively reorder the steps, add more steps, delete steps, or otherwise modify the steps. Step 322, for instance, is an entry step. The conditions for meeting the entry step are that a purchase invoice is sent for approval. When the workflow displayed in pane 318 is stored for runtime operation, then when a condition exists where a purchase invoice is sent for approval, within computing system 102, the workflow displayed in pane 318 will be triggered and executed. Of course, the display 316 shown in FIG. 8A is only one example of a visual workflow designer user interface display.

Figure 8B:
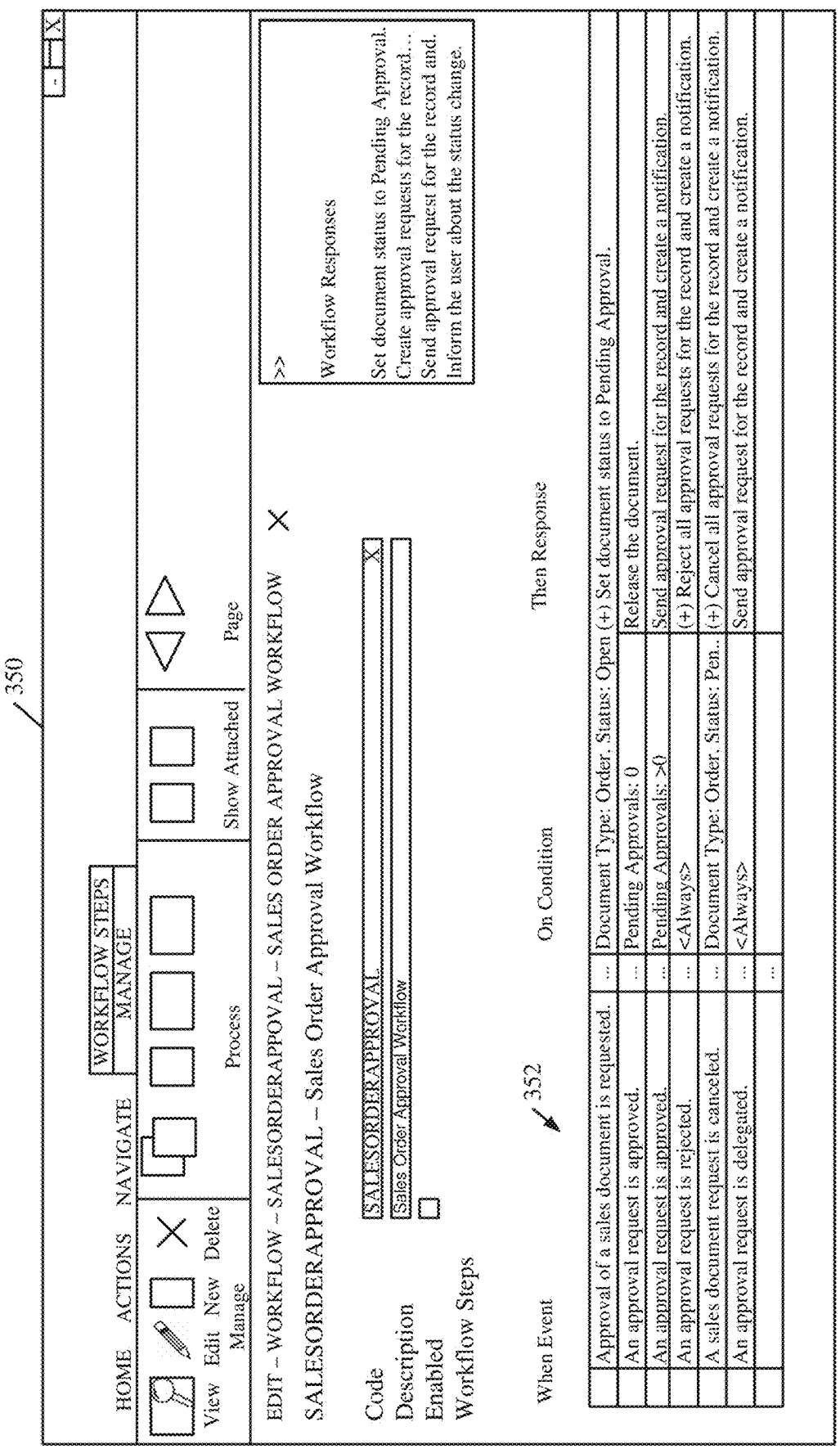

FIG. 8B shows one example of how the workflow illustrated in FIG. 8A, may appear in a tabular workflow designer. FIG. 8B thus shows user interface display 350. Display 350 illustratively includes a set of workflow steps set out in tabular form, in table 352. Table 352 includes a column that identifies an event, a triggering condition, and a response. Again, this is only one example of how a workflow designer interface may be generated in a tabular workflow designer.

Referring again to the flow diagram of FIG. 7, workflow generator system 190 will then detect user inputs interacting with the user input mechanisms in order to edit the selected workflow. This is indicated by block 360 in FIG. 7.

Figure 8C:

FIG. 8C shows one example of a user interface display that allows the user to edit event conditions in a selected workflow. For example, from either of the user interface displays shown in FIG. 8A or FIG. 8B, the user may actuate an edit user input mechanism which will allow the user to edit event conditions in the workflow being edited. The user may thus be navigated to an event condition modification user interface display, such as display 361 shown in FIG. 8C. It can be seen that display 361 provides a set of user input mechanisms that allow the user to edit the event conditions associated with the workflow, or a step in the workflow. Display 361 shows a set of user input mechanisms that comprise drop down menus so that the user can select the various conditions to be monitored. Again, this is only one example of a user interface display that can be used by a user to edit certain portions of a workflow.

At some point, the user will wish to apply the edits to the workflow being edited. This is indicated by block 362.

Workflow definition generator 200 then generates the workflow metadata (if it has not already been generated) to reflect the edits input by the user. It then applies the edits to the workflow definition 136 in data store 120, corresponding to the workflow being edited. Applying the edits to the definition in data store 120 is indicated by block 364.

Step injection component 192 then determines whether there are any in-flight instances of the edited workflow (e.g., whether there are any instances of the workflow that are currently running). This is indicated by block 366. If not, then the edits are complete. This is because the workflow definitions 136 for the edited workflow have been stored in data store 120 so that next time that workflow is triggered, the new definition will be used as the instance-specific definition for executing the workflow.

However, if, at block 366, it is determined that there are in-flight instances of the edited workflow, then instantiated workflow state visualizer 194 surfaces a visualization for each of the in-flight workflow instances. The visualization illustratively indicates the state of each of the running instances. Surfacing such a visualization is indicated by block 368 in FIG. 7.

FIG. 8D shows one example of such a user interface display 370. It can be seen that display 370 includes workflow identifying information, such as a step identifier, an indicator as to whether the step is an entry point, etc. It also illustratively identifies the status of each step in the workflow, the step type, the function name corresponding to the step, the creation date and time, the user that created the step, the last time it was modified, etc. Of course, user interface display 370 is only one example of a user interface display that can be generated to show the status of an in-flight workflow instance. A wide variety of other displays can be used for this as well.

In any case, the state visualization allows the user to generate a step injection package. By knowing the state of each in-flight instance, the user can generate workflow steps that cause the execution agent for the corresponding in-flight workflow to apply the edits that the user has generated. When the user has generated a step injection package, component 192 provides the step injection package to the step injection application component 176 in workflow engine 116. Component 176 injects the steps into the in-flight workflow instance by applying those steps to the instance-specific copy of the workflow definition that the execution agent 174 is using, for the in-flight workflow. Detecting the user inputs defining the step injection package is indicated by block 372. Determining whether to inject them is indicated by block 374, and applying the injection packages to the instance-specific workflow definitions for the in-flight instances is indicated by block 376.

Figure 8E:
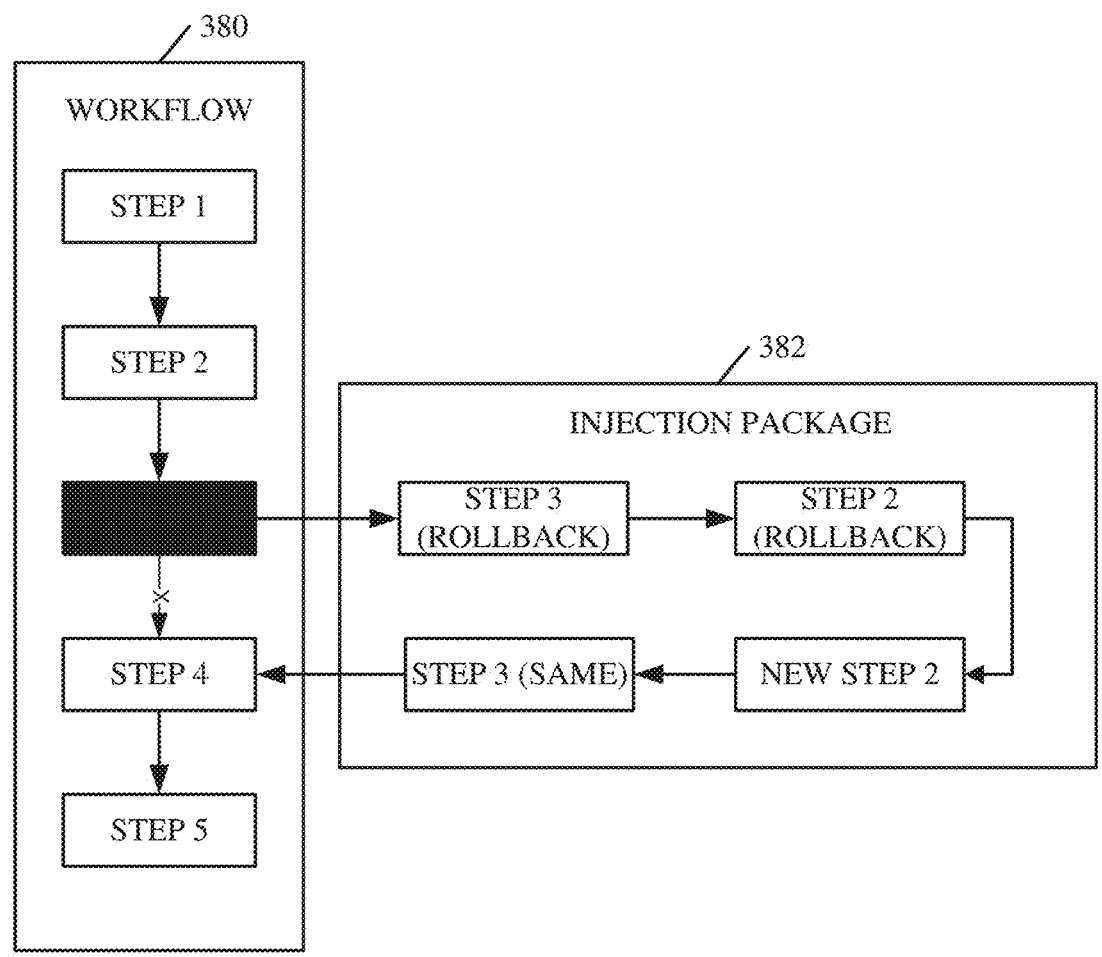
FIG. 8E shows an example of how a step injection package can affect a running workflow.

It will be appreciated that he particular steps to be injected into any instance-specific workflow definition may depend on a wide variety of factors. For instance, it may depend on the particular workflow that is being edited. It may also depend on the state of each of the instances of that workflow that are running An example may be helpful. FIG. 8E illustrates how an injection package may affect a workflow. In one scenario, assume that a workflow 380 has five steps and the user has edited step 2. However, further assume that a running instance of that workflow is already on step 3. In that case, the step injection package 382 may include steps that reverse the workflow so that it reverses (or rolls back) any actions it has taken in step 3, and any actions it has taken in step 2, and then applies the revised step 2 metadata to the instance-specific workflow definition defining workflow 380, and again reverses the direction of the workflow so that it re-executes new step 2, using the edited version of step 2.

In another scenario, the running workflow instance may have advanced too far so that reversing its direction will not be helpful. In that case, the step injection package may simply kill the workflow and re-instantiate the workflow using the edited workflow definition. Of course, there are a wide variety of other steps that can be used in a step injection package as well, and these are only examples.

It should also be noted that the individual components of a workflow can be designed using a variety of different types of criteria. For instance, the components can be defined based on what types of work are being performed in the steps of a component, or based on which particular entity is performing that work. They can also be defined based upon how a document or other physical entity is transformed during the process. For instance, a "Lead" entity or document may be generated during a first workflow. At some point, the "Lead" document may be transformed into an "Opportunity" document which, itself, may be transformed into a "Proposal" document which may, itself, eventually be transformed into a "Sales Order" document. The components of a workflow may be divided up based upon when a document is transformed. The components may further be defined based on system criteria. For instance, if an overall workflow acts on a set of tables (such as Tables 1, 2 and 3, in that order) in data store 120, the workflow may be divided into the components based on the steps that execute on the different tables. For instance, a first component may include the steps that operate on Table 1. A second component of the workflow may include the steps that operate on Table 2, and a third component of the workflow may include steps that operate on Table 3. The components of a workflow can be defined based on a wide variety of other criteria as well.

It can thus be seen that the present system advantageously defines a workflow as having an entry workflow step that defines the starting point of a workflow. The entry step may have entry conditions that define when and how the workflow is automatically instantiated. This allows automatic instantiation of an entire workflow based on a logical condition. The event conditions are advantageously collected through a data driven, on-demand runtime request page, which can collect the conditions for evaluation.

The present system also advantageously generates an instance-specific workflow definition when a workflow is instantiated. The workflow is executed from that instance-specific copy of the workflow definition. The copy can be generated as soon as the workflow is triggered or the copy of the workflow definition can be generated as the workflow steps are instantiated, on-demand The former scenario, where the workflow definition is copied when the workflow is triggered, advantageously allows the workflow instance to keep running, regardless of the workflow definition getting changed or otherwise modified in data store 120. It also advantageously allows updates to be generated for workflow definitions, regardless of whether the instances are running However, if the instance-specific copy is generated, on-demand, this advantageously allows the system to automatically adapt to live updates to the workflow definition, without any duplication.

In order to update a live instance of a workflow, the present system advantageously allows the instance to be modified, even if it has passed the point of update in the workflow definition. Workflow steps can be injected into the running instances, to loop them backwards to a state before the modified workflow step occurs. This can advantageously avoid conflicts due to changes in the underlying data structure that the workflow works against. Therefore, it can be easier to upgrade the workflow definitions and the related instances, regardless of their current state.

In addition, the present system advantageously allows steps to be injected into a workflow instance that report back state or other information corresponding to that specific instance of the workflow. This allows an administrator to manipulate an active workflow instance. The manipulated instances can be archived by an administrator or automatically so that they can be analyzed or audited. They can also be used for tracking various processes.

Further, because the workflow can have reporting steps inserted therein, on-the-fly, a debugging engineer can easily identify the particular state than an already-instantiated workflow is in, which conditions and options are applied to the current state, and also what other workflow steps it may branch to. The steps, for instance, may stop the workflow and generate an output indicative of a snapshot of the status of the workflow, at a given point. This can be very helpful in debugging operations.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 9:
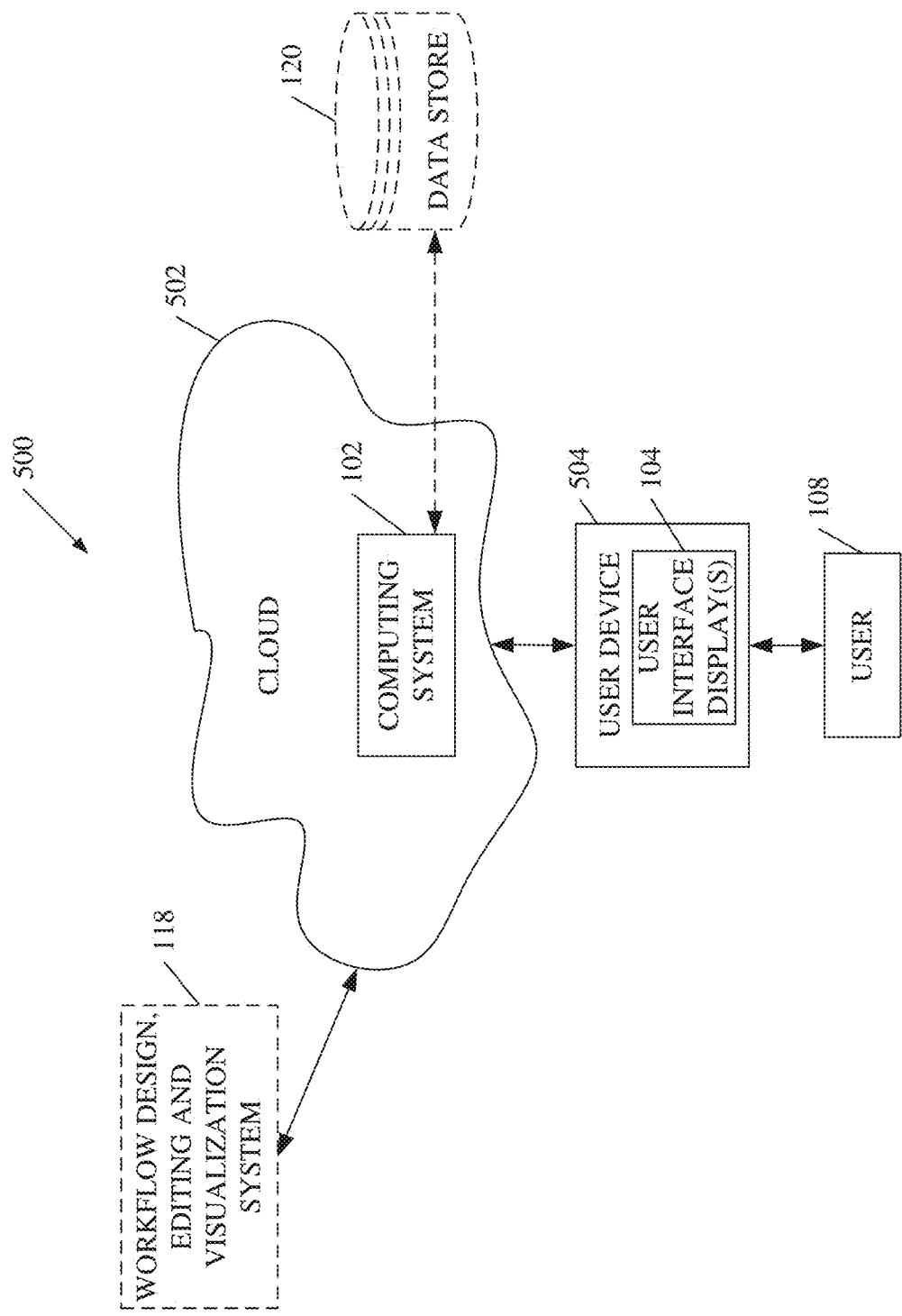
FIG. 9 is a block diagram of one example of the architecture shown in FIG. 1, deployed in a cloud computing architecture.

FIG. 9 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that computing system 102 can be located in cloud 502 (which can be public, private, or a combination where portions are public while others are private). Therefore, user 108 uses a user device 504 to access those systems through cloud 502.

FIG. 9 also depicts another example of a cloud architecture. FIG. 9 shows that it is also contemplated that some elements of computing system 102 can be disposed in cloud 502 while others are not. By way of example, data store 120 can be disposed outside of cloud 502, and accessed through cloud 502. In another example, system 118 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
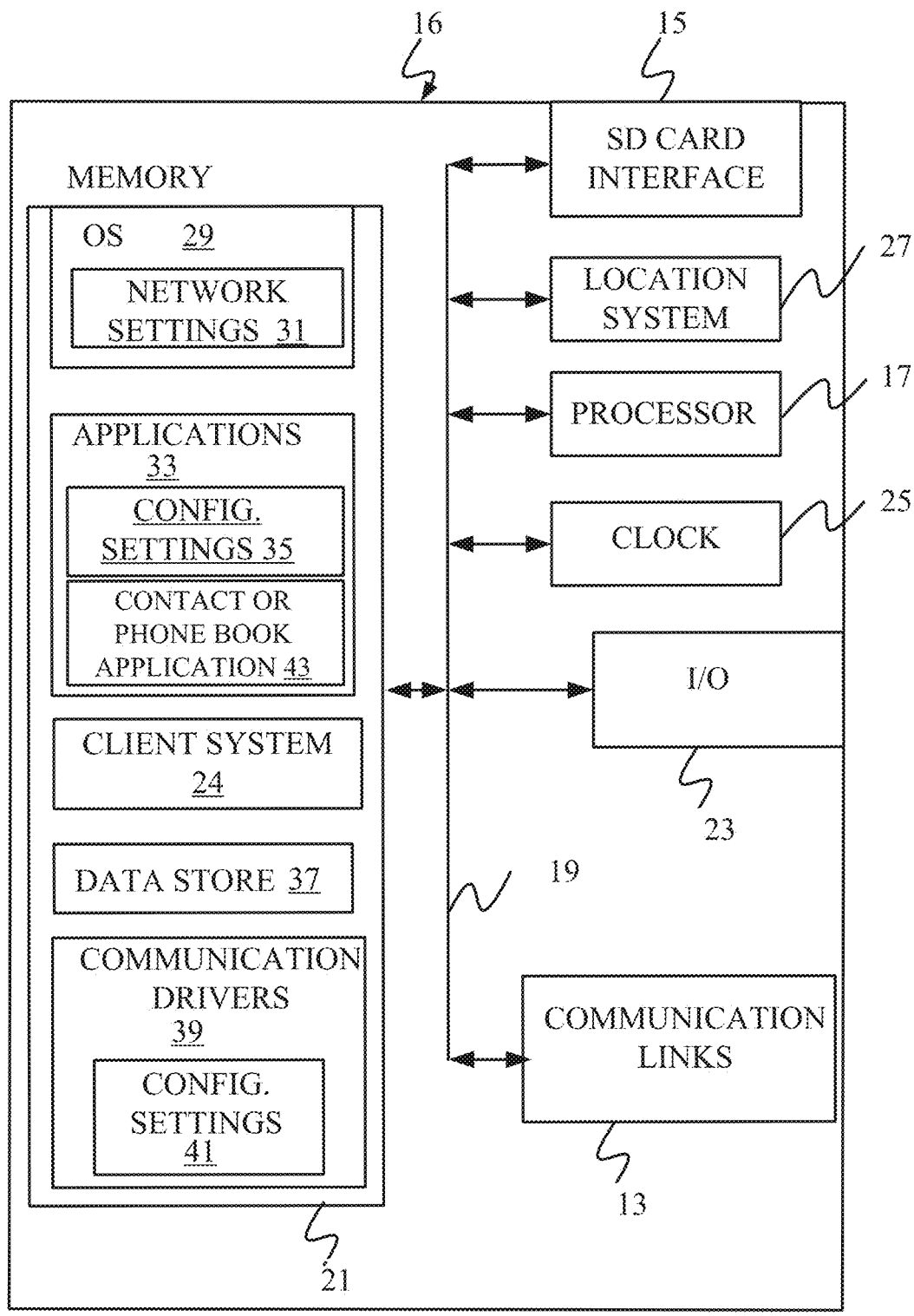
FIGS. 10-12 show examples of mobile devices that can be used in the architectures shown in the previous figures.
Figure 11:
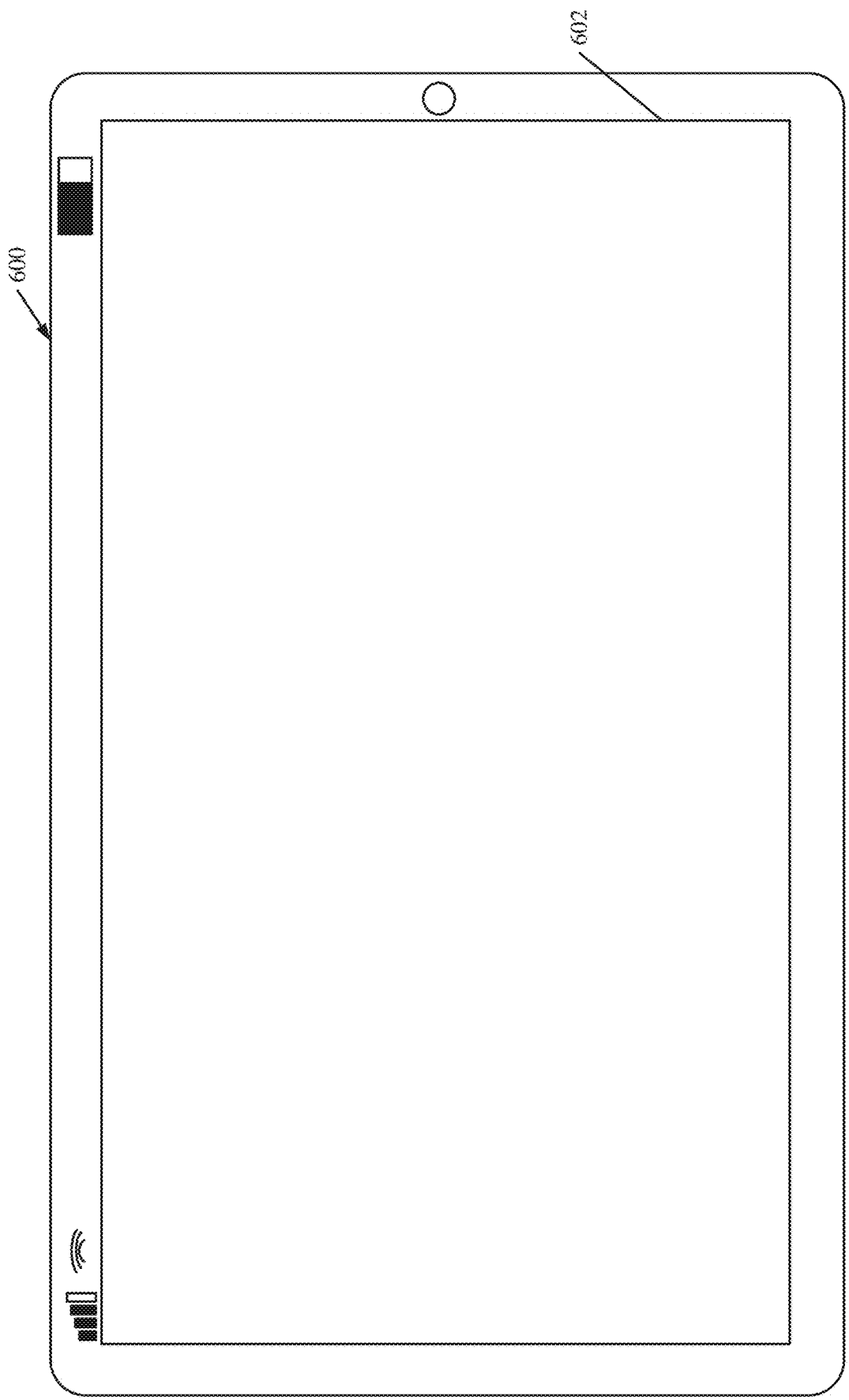
Figure 12:
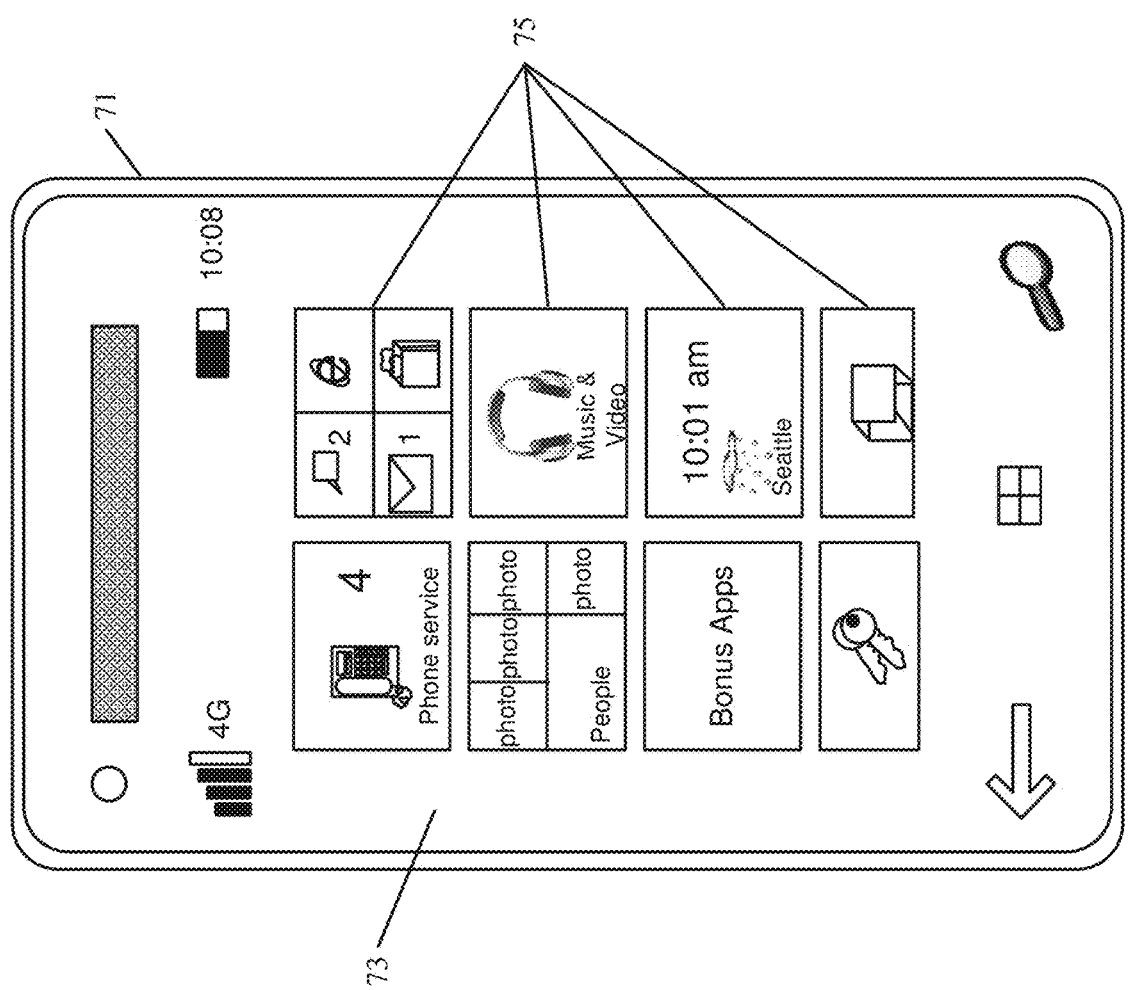

FIG. 10 is a simplified block diagram of one illustrative embodiment of a handheld or mobile computing device that can be used as a user's or client's hand held device 16, in which the present system (or parts of it) can be deployed. FIGS. 11-12 are examples of handheld or mobile devices.

FIG. 10 provides a general block diagram of the components of a client device 16 that can run components architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers 110 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a business system 24 which can run various business applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 11, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used as well. Device 16 can be, a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1Xrtt, and Short Message Service (SMS) signals. In some examples the phone also includes a Secure Digital (SD) card slot that accepts a SD card.

The mobile device can also be a personal digital assistant or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 12 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
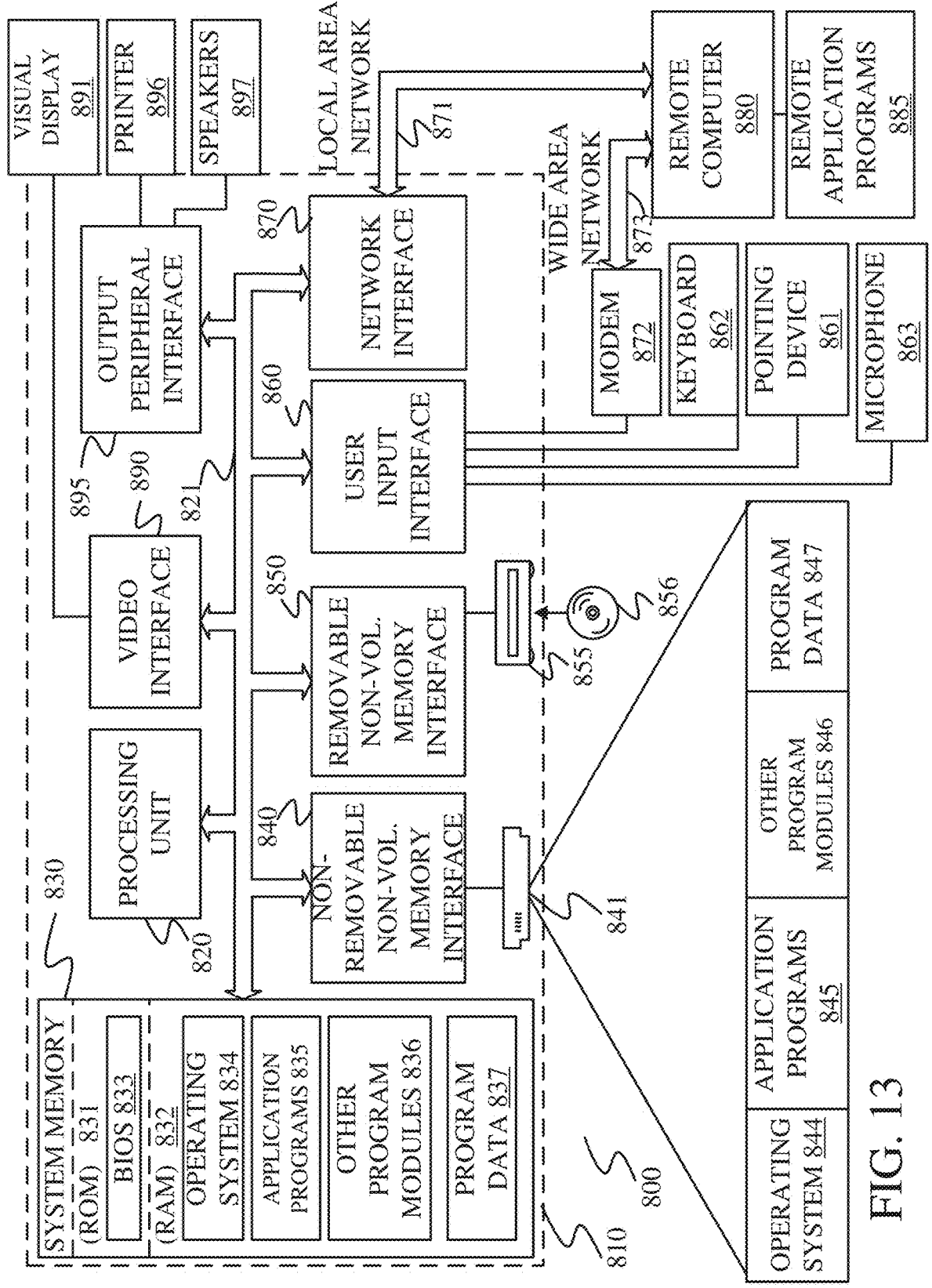
FIG. 13 is a block diagram of one example of a computing environment that can be used in the architectures shown in the previous figures.

FIG. 13 is one example of a computing environment in which architecture 100, or parts of it, (for example) can be deployed. With reference to FIG. 13, an example system for implementing some embodiments includes a general-purpose computing device in the form of a computer 810. Components of computer 810 may include, but are not limited to, a processing unit 820 (which can comprise processors or servers 110), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a workflow instantiator component that instantiates a runtime instance of a triggered workflow;

a definition cloning component that accesses a data store and makes an instance-specific copy of a workflow definition for the triggered workflow; and a step execution component that executes steps in the runtime instance of the triggered workflow based on the instance-specific copy of the workflow definition.

Example 2 is the computing system of any or all previous examples and further comprising:

a step injection application component that receives a step injection package and modifies the instance-specific copy of the workflow definition, during execution of the steps in the runtime instance, with modifications in the step injection package.

Example 3 is the computing system of any or all previous examples and further comprising:

a state tracking component that tracks a state of the runtime instance of the triggered workflow and generates a state indicator indicative of the state; and a workflow state visualizer that surfaces a state visualization, indicative of the state of the runtime instance of the triggered workflow, based on the state indicator.

Example 4 is the computing system of any or all previous examples and further comprising:

a workflow generator system that generates workflow generation user interface displays with user input mechanisms that are actuated to generate a workflow for runtime operation.

Example 5 is the computing system of any or all previous examples wherein the workflow generator system comprises:

a workflow component generator that generates component definition user input mechanisms that are actuated to divide a workflow into a set of components, each given component including an entry step with step conditions that define when the given component is triggered and a transition step with step conditions that define when the given component is finished.

Example 6 is the computing system of claim 5 wherein the component definition user input mechanisms are actuated to include one or more sub-workflows in the given component.

Example 7 is the computing system of any or all previous examples wherein the workflow generator system comprises:

a workflow definition generator that generates a metadata workflow definition for the given workflow based on detected user actuations of the component definition user input mechanisms.

Example 8 is the computing system of claim of any or all previous examples and further comprising:

a triggering condition evaluator that evaluates events in the computing system to determine whether triggering conditions are met to trigger the given workflow.

Example 9 is a computer implemented method, comprising:

instantiating a runtime instance of a triggered workflow;

accessing a data store to identify a workflow definition corresponding to the triggered workflow;

generating an instance-specific copy of the workflow definition for the triggered workflow; and executing steps in the runtime instance of the triggered workflow based on the instance-specific copy of the workflow definition.

Example 10 is the computer implemented method of any or all previous examples wherein the workflow definition comprises a set of steps arranged in an expected order of execution and wherein generating an instance-specific copy comprises:

copying the entire set of steps to the instance-specific copy of the workflow definition before beginning to execute the steps.

Example 11 is the computer implemented method of any or all previous examples wherein the workflow definition comprises a set of steps arranged in an expected order of execution and wherein generating an instance-specific copy comprises:

copying steps from the set of steps, intermittently, to the instance-specific copy of the workflow definition, during execution of the steps.

Example 12 is the computer implemented method of any or all previous examples and further comprising:

receiving a step injection package; and modifying the instance-specific copy of the workflow definition, during execution of the steps in the runtime instance, with modifications in the step injection package.

Example 13 is the computer implemented method of any or all previous examples and further comprising:

monitoring a state of the runtime instance of the triggered workflow;

generating a state indicator indicative of the monitored state; and surfacing a state visualization, indicative of the monitored state of the runtime instance of the triggered workflow, based on the state indicator.

Example 14 is the computer implemented method of any or all previous examples and further comprising:

generating workflow generation user interface displays with user input mechanisms that are actuated to generate a workflow for runtime operation.

Example 15 is the computer implemented method of any or all previous examples wherein generating the workflow generation user interface displays comprises:

generating component definition user input mechanisms that are actuated to divide a workflow into a set of components, each given component including an entry step with step conditions that define when the given component is triggered and a transition step with step conditions that define when the given component is finished.

Example 16 is the computer implemented method of any or all previous examples and further comprising:

detecting user actuations of the component definition user input mechanisms; and generating a metadata workflow definition for the given workflow based on the detected user actuations of the component definition user input mechanisms.

Example 17 is the computer implemented method of any or all previous examples and further comprising:

evaluating events in the computing system to determine whether triggering conditions are met to trigger the given workflow.

Example 18 is a computing system, comprising:

a triggering condition evaluator that evaluates events in the computing system to determine whether triggering conditions are met to trigger a workflow in the computing system;

a workflow instantiator component that instantiates a runtime instance of a triggered workflow;

a definition cloning component that accesses a data store and makes an instance-specific copy of a workflow definition for the triggered workflow;

a step execution component that executes steps in the runtime instance of the triggered workflow based on the instance-specific copy of the workflow definition; and a step injection application component that receives a step injection package and modifies the instance-specific copy of the workflow definition, during execution of the steps in the runtime instance, with modifications in the step injection package.

Example 19 is the computing system of any or all previous examples and further comprising:

a state tracking component that tracks a state of the runtime instance of the triggered workflow and generates a state indicator indicative of the state; and a workflow state visualizer that surfaces a state visualization, indicative of the state of the runtime instance of the triggered workflow, based on the state indicator.

Example 20 is the computing system of any or all previous examples and further comprising:

a workflow generator system that generates workflow generation user interface displays with user input mechanisms that are actuated to generate a workflow for runtime operation; and a workflow definition generator that detects user actuation of the user input mechanisms and generates a metadata workflow definition for the given workflow based on the detected user actuations of the user input mechanisms.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
at least one computer processor; and
a memory communicatively coupled to the at least one computer processor, the memory having stored thereon computer readable instructions that, when executed by the at least one computer processor, cause the computing system to at least:
generate a user interface display that includes:
a workflow display element that represents a workflow having a workflow definition that is stored in a data store;
a workflow editing user input mechanism; and
an in-flight instance display element that indicates a runtime instance of the workflow that is currently executing during runtime operation using an instance specific copy of the workflow definition;
based on an indication of user actuation of the workflow editing user input mechanism, define a modification that injects a step into the workflow;
edit the workflow definition stored in the data store based on the defined modification;
generate a step injection package for the runtime instance of the workflow, the step injection package defining modification that injects the step into the runtime instance of the workflow; and
modify the instance-specific copy of the workflow definition, during execution of the steps in the runtime instance, with the modification defined in the step injection package.

2. The computing system of claim 1 wherein the computer readable instructions, when executed by the at least one computer processor, cause the computing system to at least:
instantiate the runtime instance based on detection of a triggering condition;
access the data store to generate the instance-specific copy of the workflow definition for the runtime instance; and
execute steps in the runtime instance based on the instance-specific copy of the workflow definition.

3. The computing system of claim 2 wherein the computer readable instructions, when executed by the at least one computer processor, cause the computing system to at least:
identify a current execution state of the runtime instance of the workflow;
generate a state indicator display element, on the user interface display, indicative of the current execution state.

4. The computing system of claim 3 wherein the computer readable instructions, when executed by the at least one computer processor, cause the computing system to at least:
during execution of the runtime instance, modify the instance-specific copy of the workflow definition based on the modification in the step injection package and the current execution state of the runtime instance.

5. The computing system of claim 4 wherein the computer readable instructions, when executed by the at least one computer processor, cause the computing system to at least:
generate a representation of a workflow generation user interface display with a user input mechanism;
based on an indication of user actuation of the user input mechanism, generate the workflow for runtime operation;
generate a representation of a component definition user input mechanism; and
based on an indication of user actuation of the component definition user input mechanism, divide the workflow into a set of components, each component including an entry step with a step condition that define when the component is triggered and a transition step with a step condition that define when the component is finished.

6. The computing system of claim 5 wherein the computer readable instructions, when executed by the at least one computer processor, cause the computing system to at least:
based on an indication of user actuation of the component definition user input mechanism, define one or more sub-workflows in a particular one of the components.

7. The computing system of claim 6 wherein the computer readable instructions, when executed by the at least one computer processor, cause the computing system to at least:
based on an indication of user actuation of the component definition user input mechanism, generate a metadata workflow definition for the workflow.

8. The computing system of claim of claim 7 wherein the computer readable instructions, when executed by the at least one computer processor, cause the computing system to at least:
evaluate events in the computing system to determine whether a triggering condition is met to trigger the workflow.

9. A method performed by a computing system, the method comprising:
evaluating an event in the computing system to determine whether a triggering condition is met to trigger a workflow:
instantiating a runtime instance of the triggered workflow;
accessing a data store to identify a workflow definition corresponding to the triggered workflow, wherein the workflow definition comprises a set of steps arranged in an expected order of execution;
executing steps in the runtime instance of the triggered workflow based on an instance specific copy of the workflow definition, wherein the instance-specific copy of the workflow definition is
specific to the instantiated runtime instance of the triggered workflow, and
generated by copying step from the set of steps, intermittently, to the instance-specific copy of the workflow definition, during execution of the steps.

10. The method of claim 9 and further comprising:
receiving a step injection package; and
modifying
the instance-specific copy of the workflow definition, during execution of the steps in the runtime instance, with modifications in the step injection package.

11. The method of claim 10 and further comprising:
monitoring a current execution state of the runtime instance;
generating a state indicator indicative of the current execution state; and
during execution of the runtime instance, modifying the instance-specific copy of the workflow definition based on the modification in the step injection package and the current execution state of the runtime instance.

12. The method of claim 10 and further comprising:
generating a representation of a workflow generation user interface display with a user input mechanism; and
based on an indication of user actuation of the user input mechanism, generating the workflow for runtime operation.

13. The method of claim 12 wherein generating the workflow generation user interface displays comprises:
generating a representation of a component definition user input mechanism; and based on an indication of user actuation of the component definition user input mechanism, dividing a workflow into a set of components,
each component including an entry step with a step condition that defines when the component is triggered and a transition step with a step condition that defines when the component is finished.

14. The method of claim 13 and further comprising:
based on an indication of user actuation of the component, definition user input mechanism, generating metadata workflow definition for the workflow.

15. A computing system comprising:
at least one computer processor; and
a memory communicatively coupled to the at least one computer processor, the memory having stored thereon computer readable instructions that, when executed by the at least one computer processor, cause the computing system to at least:
based on evaluating events in the computing system, determine whether a triggering condition is met;
based on determining that the triggering condition is met, trigger a corresponding workflow associated with the computing system;
instantiate a runtime instance of the triggered workflow;
create an instance-specific copy of a workflow definition for the triggered workflow;
execute steps in the runtime instance of the triggered workflow based on the instance-specific copy of the workflow definition;
identify a step injection package that defines a modification that injects a step into the triggered workflow; and
modify the instance-specific copy of the workflow definition, during execution of the steps in the runtime instance, with the modification defined in the step injection package.

16. The computing system of claim 15 wherein the computer readable instructions, when executed by the at least one computer processor, cause the computing system to at least;
identify a current execution state of the runtime instance of the triggered workflow;
generate a state indicator indicative of the current execution state; and
during execution of the runtime instance, modify the instance-specific copy of the triggered workflow definition based on the modification in the step injection package and the current execution state of the runtime instance.

17. The computing system of claim 16 wherein the computer readable instructions, when executed by the at least one computer processor, cause the computing system to at least:
generate a representation of a workflow generation user interface display with a user input mechanism; and
based on an indication of user actuation of the user input mechanism, generate the workflow for runtime operation.

18. The computing system of claim 17 wherein the computer readable instructions, when executed by the at least one computer processor, cause the computing system to at least:
generate a representation of a component definition user input mechanism; and based on an indication of user actuation of the component definition user input mechanism, divide the workflow into a set of components, each component including an entry step with a step condition that define when the component is triggered and a transition step with a step condition that define when the component is finished.

\* \* \* \* \*